(12) United States Patent
Klemenz (10) Patent No.: US 11,496,429 B1
(45) Date of Patent: Nov. 8, 2022

(54) MANAGING AND REPLAYING PERSISTENT DRAFT MESSAGES FOR ENTITY DATA

(71) Applicant: SAP SE, Walldorf (DE)

(72) Inventor: Oliver Klemenz, Sinsheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/508,656

(22) Filed: Oct. 22, 2021

(51) Int. Cl.
*H04L 51/216* (2022.01)
*H04L 51/42* (2022.01)
*H04L 51/212* (2022.01)
*H04L 51/234* (2022.01)

(52) U.S. Cl.
CPC .......... *H04L 51/216* (2022.05); *H04L 51/212* (2022.05); *H04L 51/234* (2022.05); *H04L 51/42* (2022.05)

(58) Field of Classification Search
CPC ... H04L 51/216; H04L 51/212; H04L 51/234; H04L 51/42
See application file for complete search history.

(56) References Cited

U.S. PATENT DOCUMENTS

| 8,356,056 | B2 | 1/2013 | Schlarb et al. |
| 8,732,668 | B2 | 5/2014 | Klemenz et al. |
| 8,880,561 | B2 | 11/2014 | Klemenz et al. |
| 8,997,070 | B2 | 3/2015 | Klemenz et al. |
| 9,070,107 | B2 | 6/2015 | Klemenz |
| 9,075,597 | B2 | 7/2015 | Klemenz |
| 9,367,199 | B2 | 6/2016 | Klemenz et al. |
| 9,530,115 | B2 | 12/2016 | Klemenz |
| 9,600,299 | B2 | 3/2017 | Klemenz et al. |
| 9,886,270 | B2 | 2/2018 | Bestfleisch et al. |
| 10,216,615 | B2 | 2/2019 | Klemenz |
| 10,255,049 | B2 | 4/2019 | Klemenz et al. |
| 10,430,521 | B2 | 10/2019 | Bestfleisch et al. |
| 10,498,862 | B2 | 12/2019 | Klemenz |
| 10,528,406 | B2 | 1/2020 | Klemenz |

(Continued)

FOREIGN PATENT DOCUMENTS

JP            11126129 A     *   5/1999

OTHER PUBLICATIONS

Experience.sap.com [online], "Draft Handling" available on or before Aug. 6, 2020, via Internet Archive: Wayback Machine URL <http://web.archive.org/web/20200920043410/https:/experience.sap.com/fiori-design-web/draft-handling/>, retrieved on Oct. 22, 2021 (Year: 2020).*

(Continued)

*Primary Examiner* — Austin J Moreau
(74) *Attorney, Agent, or Firm* — Fish & Richardson P.C.

(57) ABSTRACT

The present disclosure involves systems, software, and computer implemented methods for managing and replaying persistent draft messages for entity data. One example method includes receiving a request from a client to read entity data in a draft of an entity. Previously-generated messages for the draft of the entity are retrieved and regenerated. A request to change a field of the entity is received and a set of previously-generated messages that correspond to the field is identified. Each message in the set of previously-generated messages is marked as invalid to prevent subsequent regeneration of messages in the set of messages. Each message in the previously-generated messages that is not marked as invalid is stored as a persistent draft message for the draft of the entity.

20 Claims, 11 Drawing Sheets

(56) References Cited

U.S. PATENT DOCUMENTS

| | | | |
|---|---|---|---|
| 10,558,473 | B2 | 2/2020 | Klemenz |
| 10,565,029 | B1 | 2/2020 | Klemenz |
| 10,572,278 | B2 | 2/2020 | Klemenz |
| 10,606,706 | B2 | 3/2020 | Bestfleisch et al. |
| 10,747,736 | B2 | 8/2020 | Klemenz et al. |
| 10,802,810 | B2 | 10/2020 | Klemenz et al. |
| 10,963,889 | B2 | 3/2021 | Klein et al. |
| 11,016,830 | B2 | 5/2021 | Klemenz |
| 11,093,220 | B2 | 8/2021 | Klemenz et al. |
| 11,093,222 | B2 | 8/2021 | Klemenz et al. |
| 2013/0031116 | A1 | 1/2013 | Klemenz |
| 2014/0164963 | A1 | 6/2014 | Klemenz et al. |
| 2014/0195892 | A1* | 7/2014 | Hampton ............... G06F 40/166 715/234 |
| 2014/0280484 | A1 | 9/2014 | Klemenz et al. |
| 2016/0171733 | A1 | 6/2016 | Klemenz et al. |
| 2016/0350348 | A1* | 12/2016 | Mielenhausen ....... G06F 16/211 |
| 2016/0378285 | A1 | 12/2016 | Graf et al. |
| 2020/0272489 | A1 | 8/2020 | Klemenz et al. |
| 2021/0243142 | A1* | 8/2021 | Treat .................... H04L 51/212 |

OTHER PUBLICATIONS

Experience.sap.com [online], "Draft Handling" available on or before Aug. 6, 2020, via Internet Archive: Wayback Machine URL <http://web.archive.org/web/20200920043410/https:/experience.sap.com/fiori-design-web/draft-handling/>, retrieved on Oct. 22, 2021, URL <https:/experience.sap.com/fiori-design-web/draft-handling>, 32 pages.

\* cited by examiner

<Unnamed Object>

Header Closing Structure Transaction

Task List ID:*  Task List Type:
   Task List Template

Task List Default Description:*

Communication System:*
CC8 (FCCX_BACKEND_ODATA_CC8)

Factory Calendar ID:*

Ledger:

Accounting Principle:

Fiscal Year Variant:

Time Zone:*

Owner Type:*
User

Owner:
user1@corp.com

Responsible User Type:
User

User Responsible:

Authorization Group:

Email Notification Configuration:
Basics

Closing Structure

Closing Hierarchy Type:*

Create — 202    Cancel

<Unnamed Object>

Header  Closing Structure Transaction

Task List ID:*
[TaskList1] — 402
Task List Default Description:*
[__________] — 406

Task List Type:
[Task List Template]

Owner Type:*
[User ____ >]
Owner:
[user1@corp.com]
Responsible User Type:
[User ____ >]
User Responsible:
[__________]
Authorization Group:
[__________]
Email Notification Configuration:
[Basics]

Communication System:*
[CC8 (FCCX_BACKEND_ODATA_CC8)] — 408
Factory Calendar ID:*
[__________]
Ledger:
[__________]
Accounting Principle:
[__________]
Fiscal Year Variant:
[__________]
Time Zone:*
[__________] — 410

Closing Structure

Draft saved... — 412    [Create] [Cancel]

MANAGING AND REPLAYING PERSISTENT DRAFT MESSAGES FOR ENTITY DATA

TECHNICAL FIELD

The present disclosure relates to computer-implemented methods, software, and systems for managing and replaying persistent draft messages for entity data.

BACKGROUND

In a software system, a draft can represent an interim version of an entity that has not yet been explicitly saved as an active version. A draft can be saved automatically which can enable recovery of unsaved changes if an editing activity is interrupted. Accordingly, drafts can prevent data loss such as if an application terminates unexpectedly.

SUMMARY

The present disclosure involves systems, software, and computer implemented methods for managing and replaying persistent draft messages for entity data. An example method includes: receiving a request from a client to read entity data in a draft of an entity; retrieving previously-generated messages for the draft of the entity; regenerating the previously-generated messages for the draft of the entity; receiving a request to change a first field of the entity; identifying a first set of previously-generated messages that correspond to the first field; marking each message in the first set of previously-generated messages as invalid to prevent subsequent regeneration of messages in the first set of messages; identifying a new message based on a change of the first field; adding the new message to the previously-generated messages; identifying a transaction result for a first transaction for the draft of the entity; and storing each message in the previously-generated messages that is not marked as invalid as a persistent draft message for the draft of the entity.

Implementations can include one or more of the following features. A determination can be made that the entity supports draft processing, after receiving the request to read entity data. The previously-generated messages can include at least one error message that indicates an error condition for the entity data. The previously-generated messages can include at least one warning message that indicates a non-error condition for the entity data. A message target of the new message can be identified and normalized. A request to delete the draft of the entity can be received and each of the previously-generated messages as invalid in response to the request to delete the draft of the entity. Regenerating the previously-generated messages can include providing the previously-generated messages to the client. The client can display the previously-generated messages in a user interface. The request to change the first field can correspond to an edit to a first user interface element that corresponds to the first field. The request to change the first field can correspond to a change to the first field performed by an action of the entity. The first transaction result for the draft of the entity can be a successful save of the draft.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

An application environment, such as a cloud environment, can include various types of entities or objects. The application environment can store data for active (e.g., production) versions of entities, and the active versions can be used during production activity. An application environment can support a concept of drafts for entities to enable modification of active entity instances and creation of new entity instances. A draft is an interim version of an entity that has not yet been explicitly saved as an active version. Drafts can be saved automatically in the background whenever users add or change information within an entity while the entity is in an edit state.

When a user creates a new entity instance or edits an existing entity instance, a draft can be created to enable field validation. Field validation can occur at different times, such as after a field edit or during a consistency check that checks the entity data in the draft for consistency and completeness. Field validation or an overall consistency check can result in a list of error or warning messages, which can be displayed to the user while the entity is being edited.

Drafts can enable a same user or a different user to resume editing at a later point in time, before the instance is activated. However, if a same or different user opens a previously-edited draft, the user may not be aware of prior error or warning messages that were previously displayed at the time of prior editing to communicate any inconsistencies or errors within the entity data stored in the draft. Drafts can include inconsistent and/or erroneous data, since an entity-editing or creation process may be time-consuming, and a user (or multiple users) may use multiple editing sessions to finish completing or correcting the entry of entity data.

To enable replaying of error and warning messages for drafts, persistent draft messages can be stored in association with the draft when the draft is saved. The stored persistent draft messages can be replayed when a draft is re-opened to enable the current user to view and understand any errors or warnings that are applicable to the entity data stored in the draft. Management of persistent draft messages can include invalidation of messages that are no longer applicable to prevent replaying of irrelevant messages. An entity may include sub-entities, and when a user navigates down in a navigation hierarchy to a sub-entity, any relevant persistent draft messages for the sub-entity can be automatically displayed in context with the sub-entity data. After persistent draft messages are replayed, modification of a user interface element may correct a given error, and a corresponding error message can be hidden while maintaining presentation of messages that still correspond to remaining inconsistent or erroneous entity data.

The usability of entity user interfaces can increase with the use of persistent draft messages, since the replaying of the persistent draft messages enables the user to directly view current and applicable error, warning, and information messages when opening a draft in the user interface. The replaying of persistent draft messages can replicate a type of immediate feedback a user may receive in response to direct editing of entity field data. Providing a user with pertinent information directly and automatically upon opening of a draft or navigation to a sub-entity can save user time and computing resources, since automatically directing a user to existing error conditions in an entity by replaying persistent draft messages can result in preventing a user from aimlessly navigating different portions of a user interface trying to determine existing entity inconsistencies or abandoning a draft and recreating a draft due to a user becoming frustrated from not knowing what issues exist with the current draft.

Figure 1:
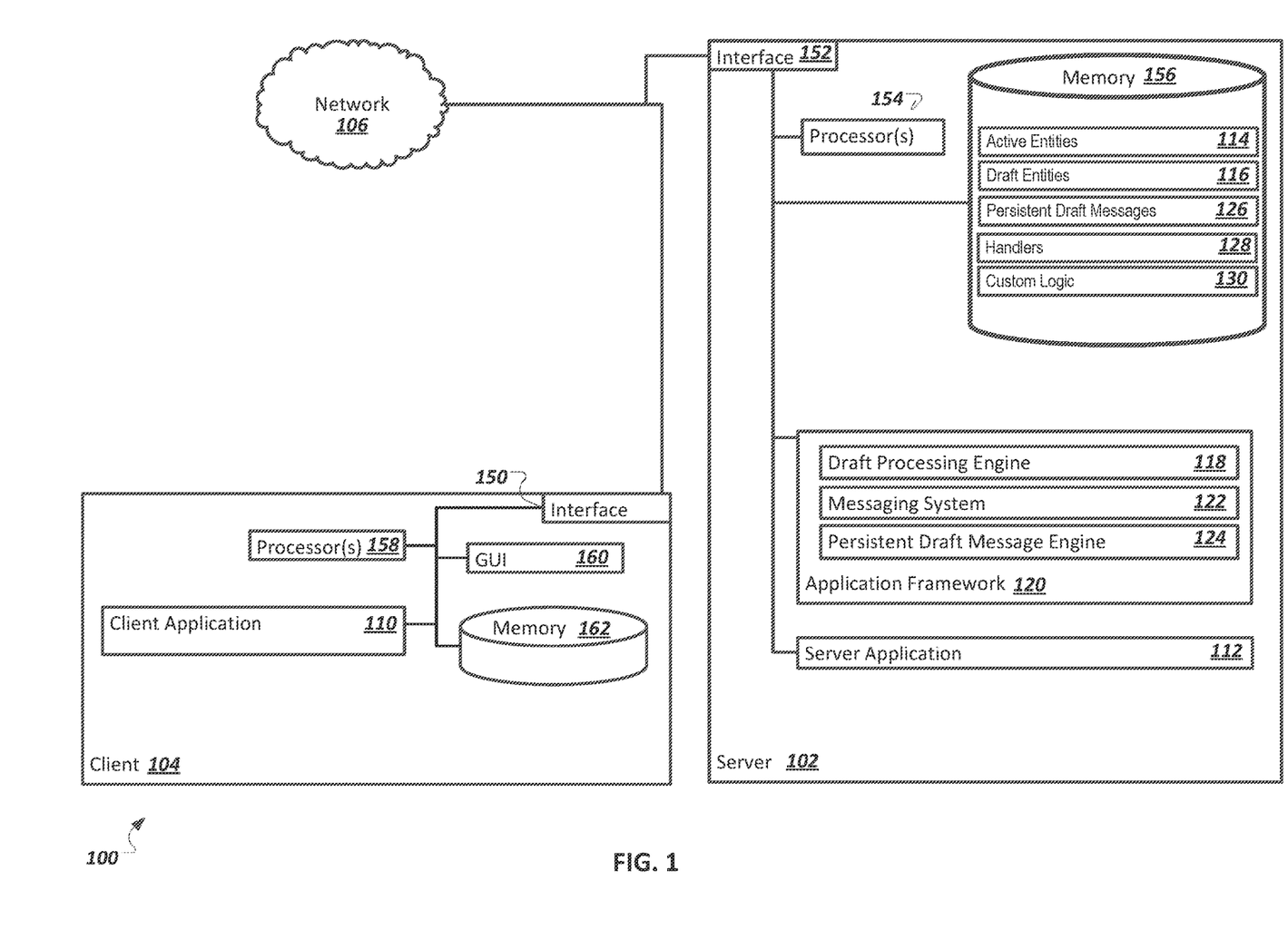
FIG. 1 is a block diagram illustrating an example system for managing and replaying persistent draft messages for entity data.

FIG. 1 is a block diagram illustrating an example system 100 for managing and replaying persistent draft messages for entity data. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system, server, or component may be provided by multiple systems, servers, or components, respectively.

A client application 110, which may be a client-side version of a server application 112, can enable a user to view and edit entity data. For example, the client application 110 can enable the user to view and/or edit entity data of active entities 114. As another example, the client application 110 can enable a user to create, view, and edit entity data of draft entities 116. The draft entities 116 represent inactive versions of the active entities 114. The user can edit the draft entities, for example, in multiple sessions, before a respective draft entity 116 is activated to an active entity 114. Draft entities 116 can be saved, before activation, in an inconsistent state. For example, while editing the draft entity 116, the user may save the draft entity 116 before all required fields have a value and/or while one or more fields have inconsistent values or values that would not be allowed in an active entity 114. The user (or even multiple, different users) can use multiple editing sessions to correct any error conditions in the draft entity 116. A draft processing engine 118 included in an application framework 120 can manage creation, saving, and activation of draft entities 116.

While the user is editing a draft entity 116, validation logic in the server application 112 (and/or client-side validation logic in the client application 110) can raise error and/or warning messages using a messaging system 122 of the application framework. Error and warning messages can be displayed in the client application 110, for example, in response to a field change. However, if the user saves the draft entity 116 in an inconsistent state, and the draft entity 116 is later opened in another editing session, then the inconsistent state of the draft entity 116 might not be clear to the user unless the previously-generated messages are replayed for the user.

A persistent draft message engine 124 can manage persistent draft messages 126 that can be replayed, for example, upon re-opening of a draft entity 116 in the client application 110. The user (or a different user) can easily see any issues that may still need to be corrected in the draft entity 116. As described in more detail below, the persistent draft message engine 124 can handle the recording, updating, and replaying of the persistent draft messages 126, including removing any previously-generated and previously-stored messages that are no longer applicable (e.g., due to corrections performed by the user). As described in more detail below, the persistent draft message engine 124 can provide handler code 128 for various handlers that can be invoked by the persistent draft message engine 124 (or in some implementations or for some handlers, by the draft processing engine 118 or the application framework 120). The persistent draft engine 124 can enable customers to provide custom logic 130 to handle special cases that are not automatically handled by the handler code 128.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150 and 152 are used by the client device 104 and the server 102, respectively, for communicating with other systems in a distributed environment—including within the system 100—connected to the network 106. Generally, the interfaces 150 and 152 each comprise logic encoded in software and/or hardware in a suitable combination and operable to communicate with the network 106. More specifically, the interfaces 150 and 152 may each comprise software supporting one or more communication protocols associated with communications such that the network 106 or interface's hardware is operable to communicate physical signals within and outside of the illustrated system 100.

The server 102 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the server 102. Specifically, each processor 154 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 156. In some implementations, the server 102 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application 110. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 158. Each processor 158 included in the client device 104 may be a central processing unit (CPU), an application specific integrated circuit (ASIC), a field-programmable gate array (FPGA), or another suitable component. Generally, each processor 158 included in the client device 104 executes instructions and manipulates data to perform the operations of the client device 104. Specifically, each processor 158 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 160.

The GUI 160 of the client device 104 interfaces with at least a portion of the system 100 for any suitable purpose, including generating a visual representation of the client application 110. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a generic web browser, intelligent engine, and command line interface (CLI) that processes information and efficiently presents the results to the user visually.

Memory 162 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
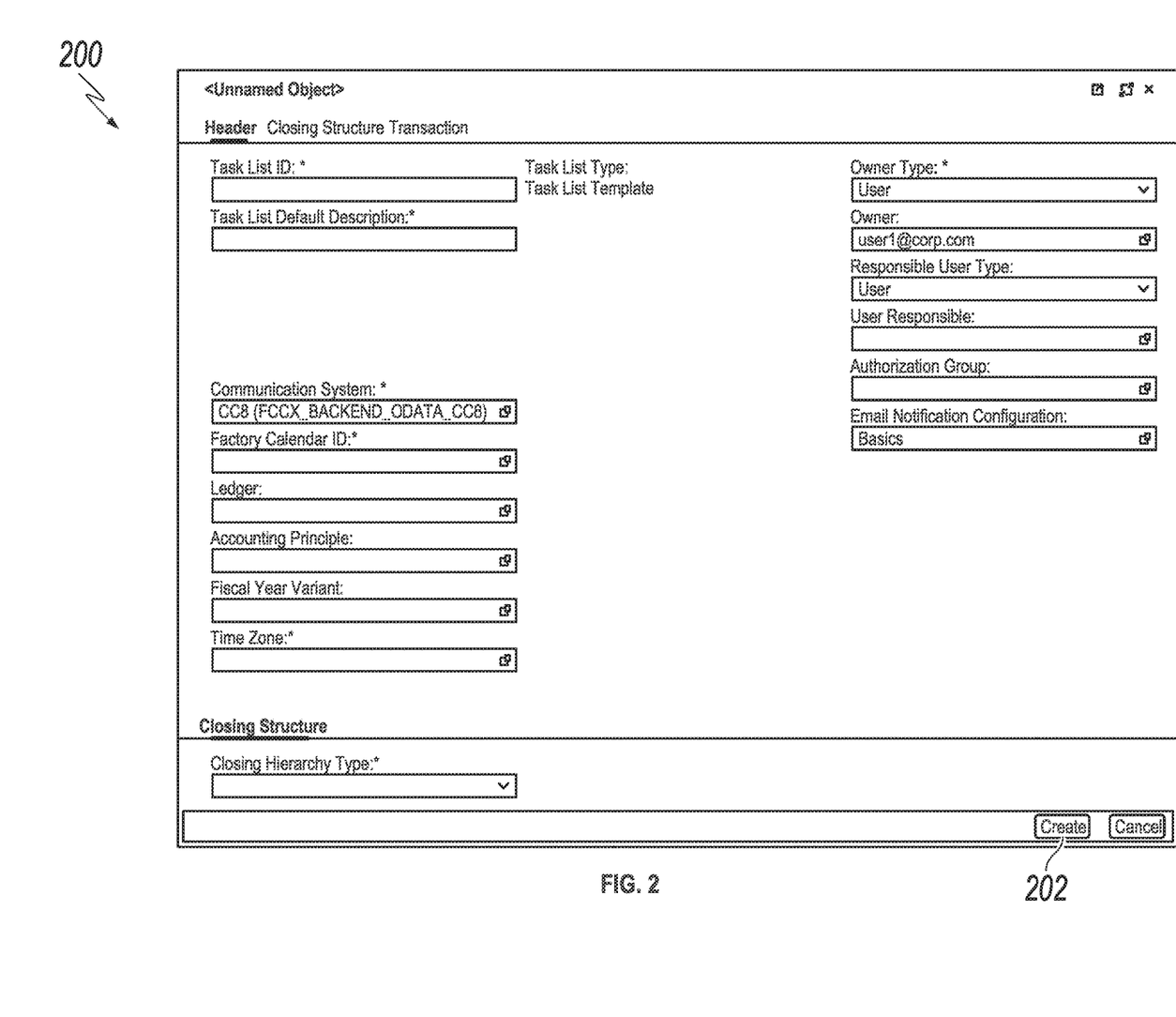
FIGS. 2, 4, 5, and 6 illustrate example user interfaces.

FIG. 2 illustrates an example user interface 200. The user interface 200 can be used, for example, to edit entity data for a task list entity. Any edits the user may make in the user interface 200, such as in one or more edit sessions, can be saved in a draft entity. The user can request to activate a draft entity by selecting a create button 202.

Figure 3:
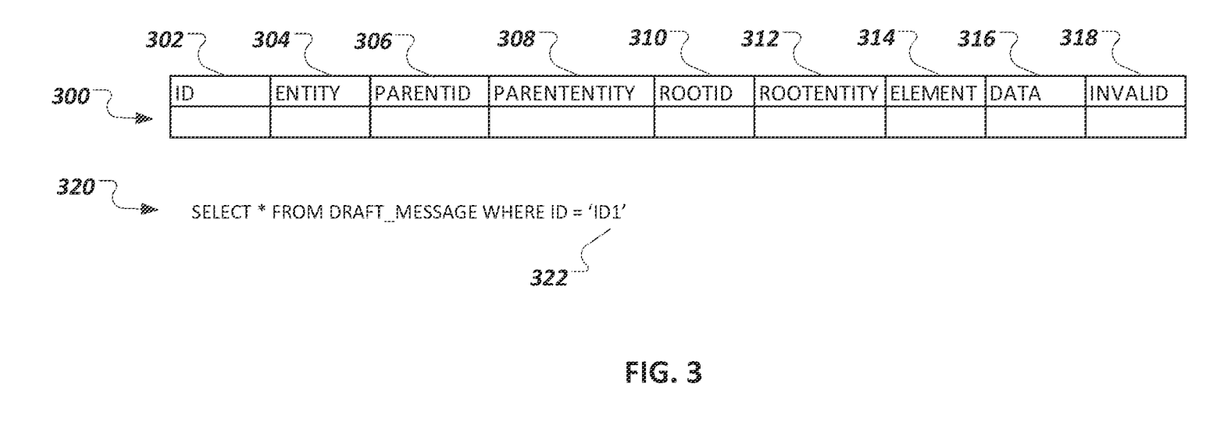
FIG. 3 illustrates an example draft message table.

FIG. 3 illustrates an example draft message table 300. The draft message table 300 can store, for each persistent draft message, an instance identifier 302, an entity type 304, a parent identifier 306, a parent entity type 308, a root entity identifier 310, a root entity type 312, a target element reference 314, a data payload 316, and an invalid flag 318. The instance identifier 302 and the entity reference 304 can identify an entity instance to which a message applies. The parent identifier 306, parent entity type 308, root entity identifier 310, and root entity type 312 can provide hierarchical information for the entity. The target element reference 314 can indicate a field of the entity to which the message applies. The data payload 316 can include a description of the message. The invalid flag 318 can indicate whether the message is currently valid or has been invalidated. Message invalidation is described in more detail below. A query 320 can be executed to filter the draft message table 300 to show draft message information for an entity instance having a particular identifier 322. With respect to a state of the user interface 200 described above (e.g., which may have just been opened for creation of a new draft), execution of the query 320 may result in an empty data set, as currently shown in the draft message table 300.

Figure 4:
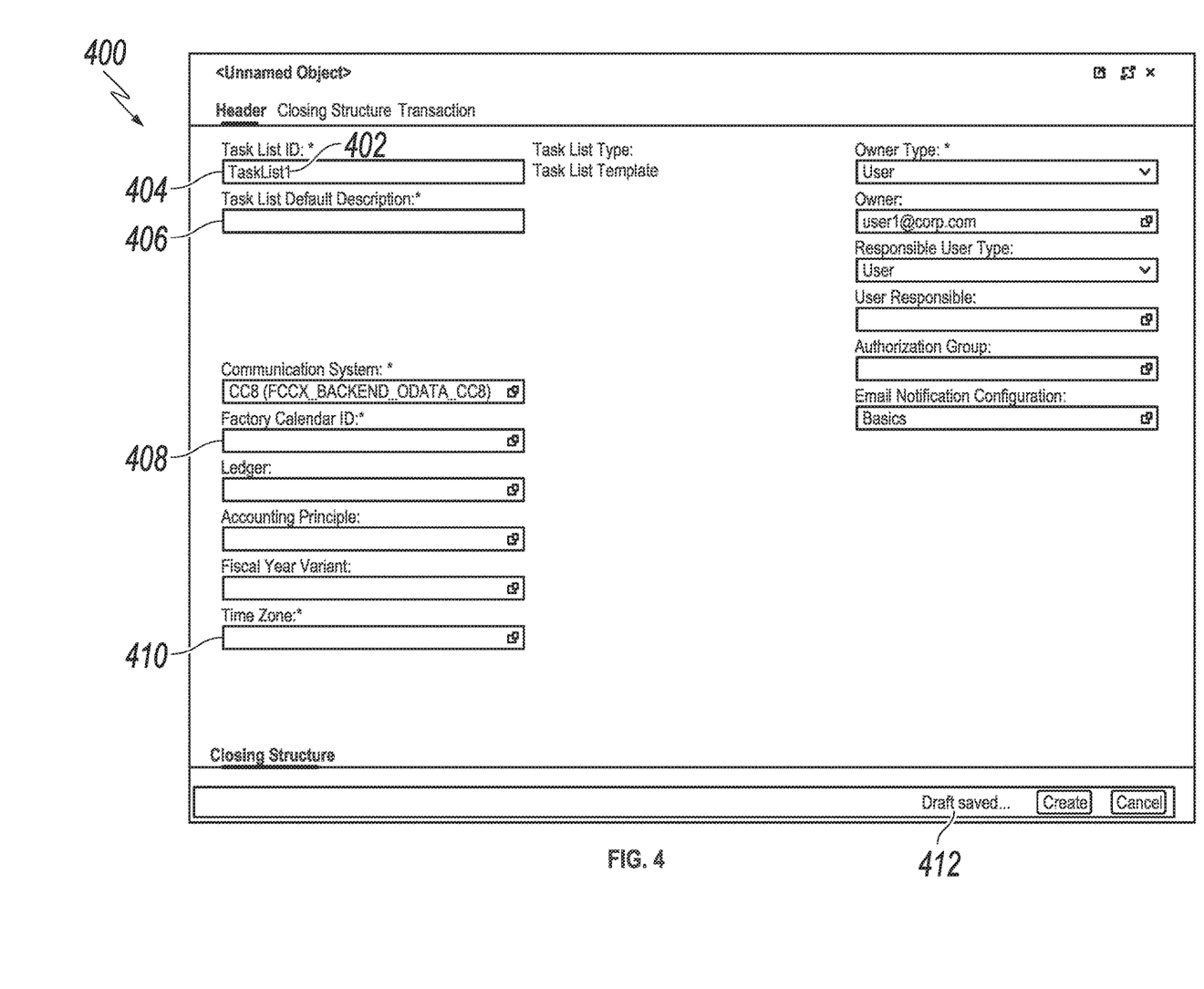

FIG. 4 illustrates an example user interface 400. The user interface 400 reflects an intermediate state of editing for a task list entity. The user has provided a task list identifier 402 (e.g., task list name) in a user interface (UI) element 404. However, the user navigated to a description UI element 406 corresponding to a required description field without providing a value. Similarly, the user has not provided a value in either a factory calendar UI element 408 for a required factory calendar field or a time zone UI element 410 for a required time zone field.

As mentioned, draft functionality can enable a draft entity to be saved, at various times, in either a consistent or inconsistent state. In some implementations, the user interface 400 is configured to automatically save contents of the user interface 400 to a draft entity, such as in response to one or more types of events. As examples, a draft can be saved in response to a UI element changing, a user navigating away from the UI element, or in response to a periodic timer elapsing (e.g., a draft can automatically be saved every 30 seconds). As indicated by a message 412, the contents of the user interface 400 have been saved as a draft.

Figure 5:
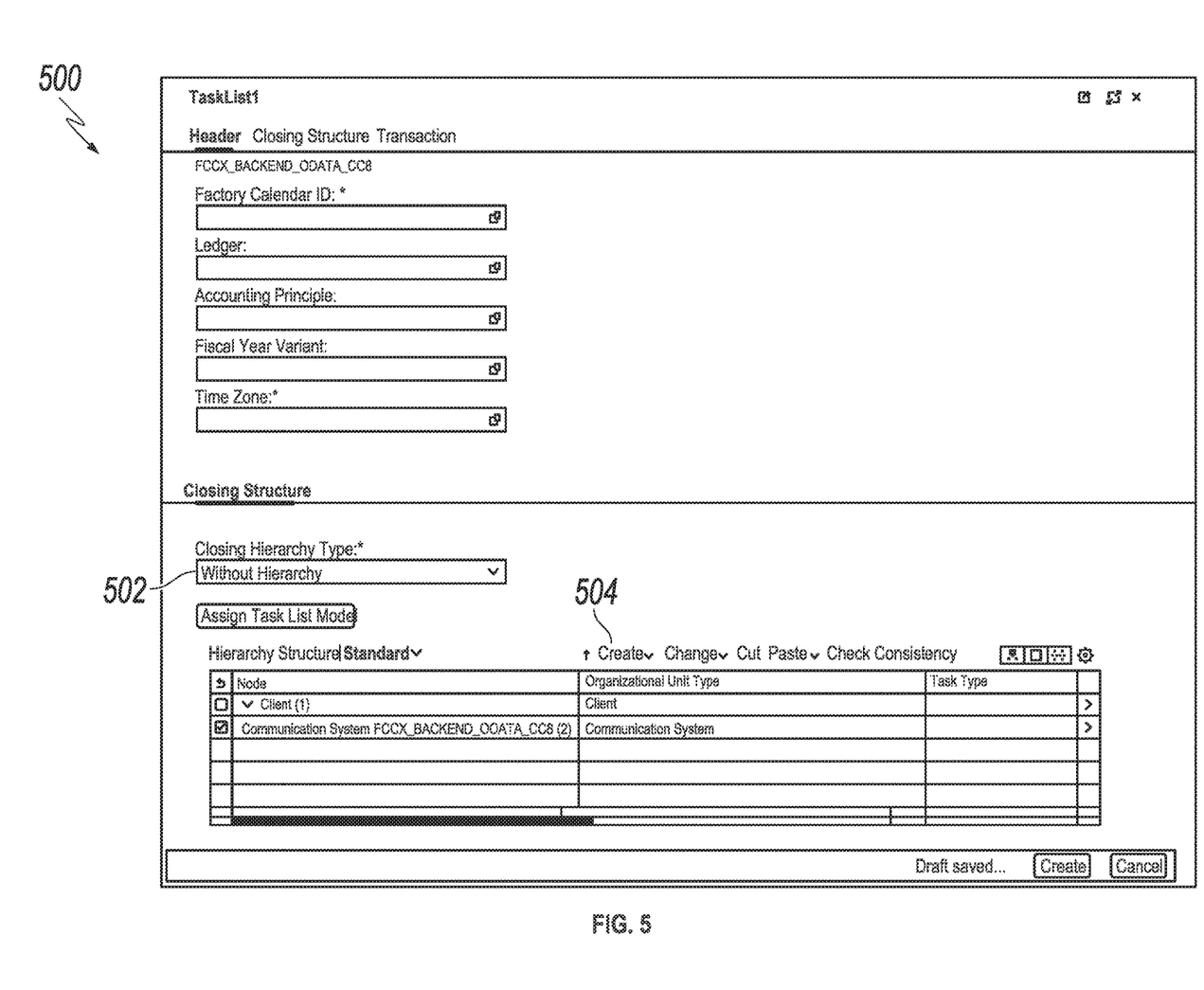

FIG. 5 illustrates an example user interface 500. The user, for example, has scrolled the user interface 400 down so that information for a closing structure section is visible. A hierarchy setting has been specified in a hierarchy type UI element 502. The user has selected a create button 504 to create a sub-entity (e.g., a task sub-entity) that is associated with the task list draft entity.

Figure 6:
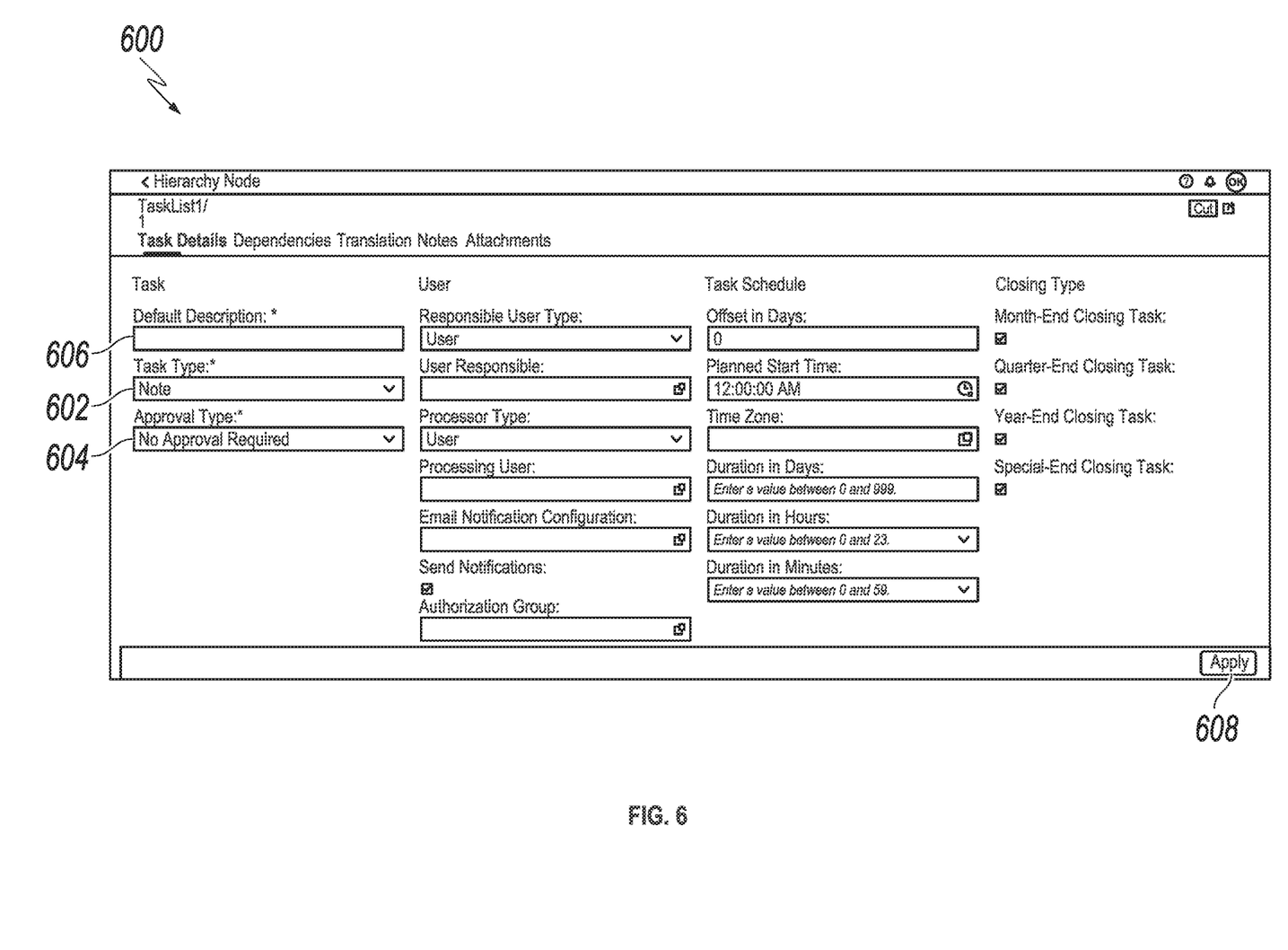

FIG. 6 illustrates another example user interface 600. The user interface 600, which can be displayed in response to selection of the create button 504 on the user interface 500, can be used to specify field values for a task sub-entity. Although a task type UI element 602 and an approval type UI element 604 include values for corresponding required entity fields, a description UI element 606 does not include a value for a required description field. Accordingly, an error message can be generated when an apply button 608 is selected.

Figure 7:
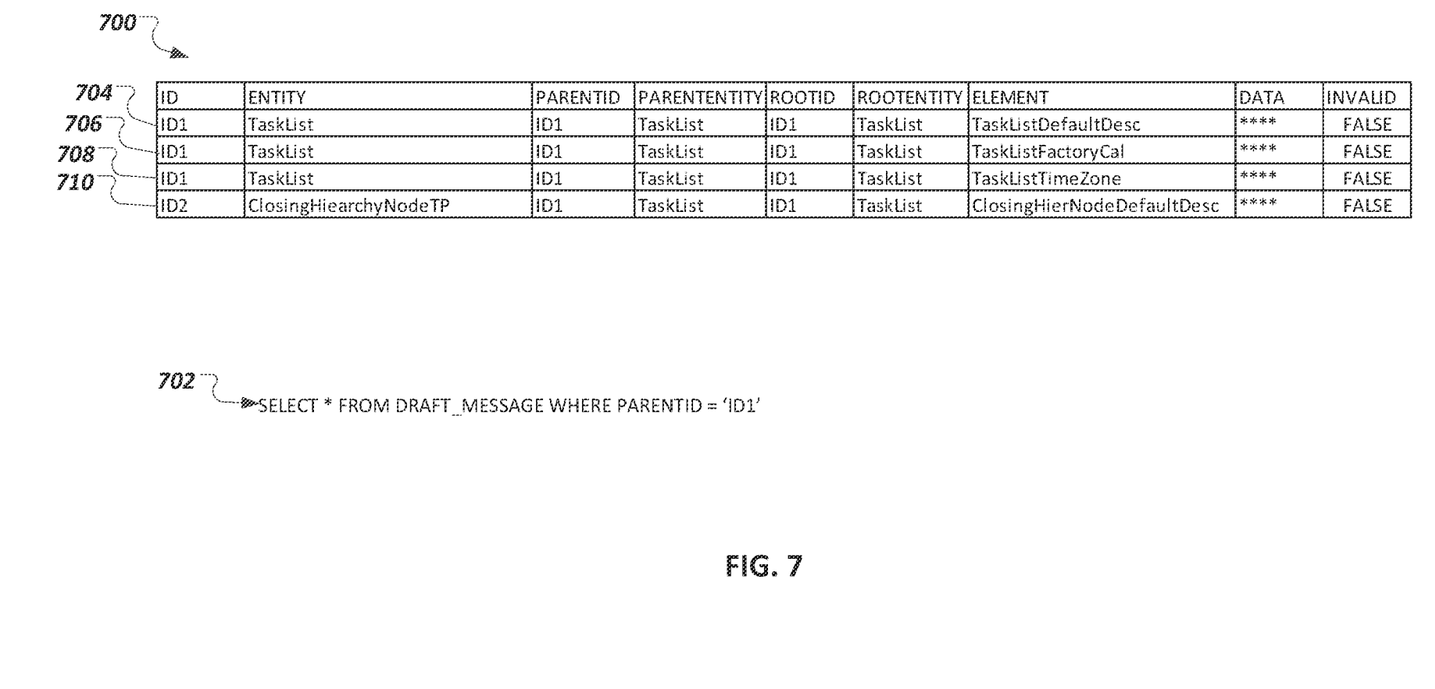
FIG. 7 illustrates an example filtered draft message table.

FIG. 7 illustrates an example filtered draft message table 700. The filtered draft message table 700 is currently filtered by a query 702 that returns records matching a parent identifier (i.e., "ID1") corresponding to the task list draft entity that was edited using the user interface 400. Records 704, 706, and 708 correspond to messages that were generated in response to determining that values were missing for the description UI element 406, the factory calendar UI element 408, and the time zone UI element 410, respectively, during editing. A record 710 corresponds to a message that was generated due to a missing value in the description UI element 606 when editing a sub-entity on the user interface 600. Although each of the records 704, 706, 708, and 710 have a false value for the invalid flag, as described in more detail below, in response to field changes or a request to save or delete a draft, some or all records can have their invalid flag set to true to indicate that the corresponding message is no longer valid (e.g., no longer applicable) and should not be replayed. In some instances, invalid messages can eventually be removed from a draft message table (as described in more detail below).

Figure 8:
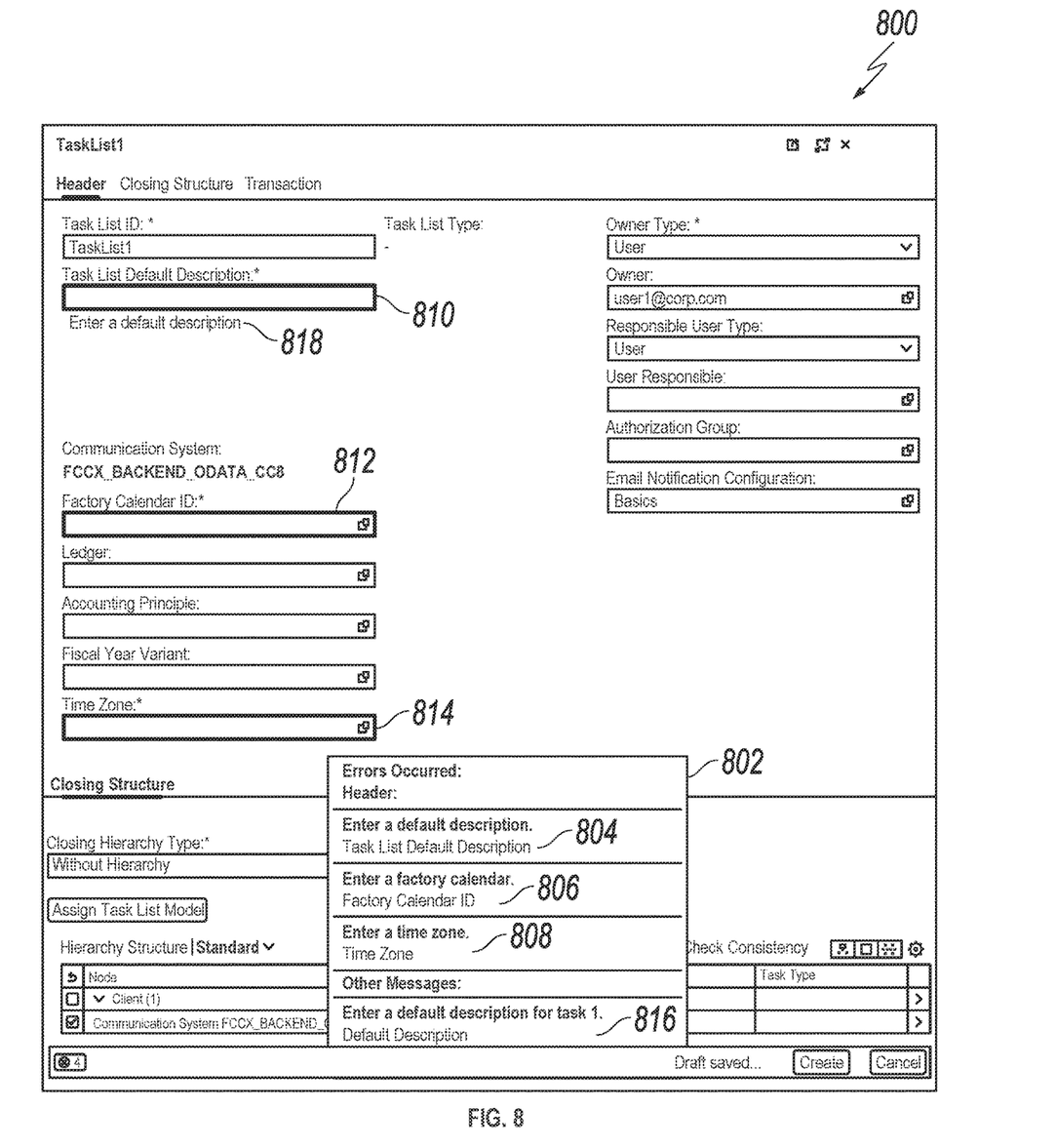
FIG. 8 illustrates an example user interface for replaying of persistent draft messages.

FIG. 8 illustrates an example user interface 800 for replaying of persistent draft messages. Persistent draft messages can be replayed in various ways. For example, a panel 802 displays messages 804, 806, and 808 that correspond to missing values in a description UI element 810, a factory calendar UI element 812, and a time zone UI element 814, respectively. The panel 802 also includes a message 816 regarding a missing value for a field of a task sub-entity. Message targets (e.g., UI elements) can be highlighted in various ways (e.g., color, animation, line thickness, or other style changes) to indicate an error condition in a field corresponding to the UI element. In some cases, if a user selects a particular UI element that is highlighted as in error, a corresponding message such as a message 818 corresponding to the message 804 can be displayed adjacent to (e.g., underneath) the UI element. In some cases, instead of or in addition to the panel 802, each of the messages 804, 806, and 808 can be shown adjacent to respective corresponding UI elements. Regarding the message 816, if the user navigates to a sub-user interface associated with a sub-entity, the message 816 can be displayed in context on the sub-user interface (e.g., adjacent to a corresponding field on the sub-user interface and/or in a panel on the sub-user interface).

Figure 9A:
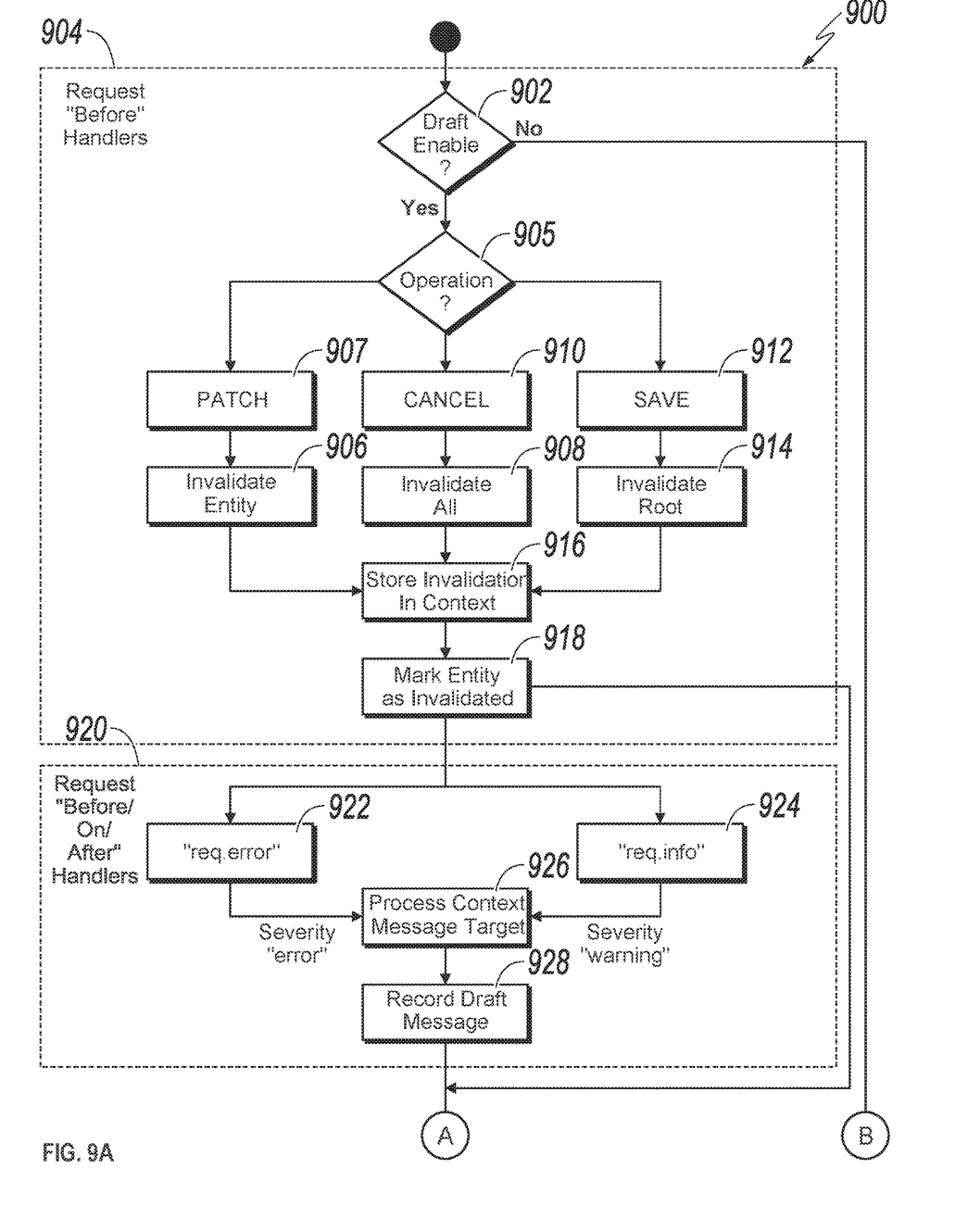
FIGS. 9A-9B depict a flowchart that illustrates various types of handlers for persistent draft message processing.
Figure 9B:
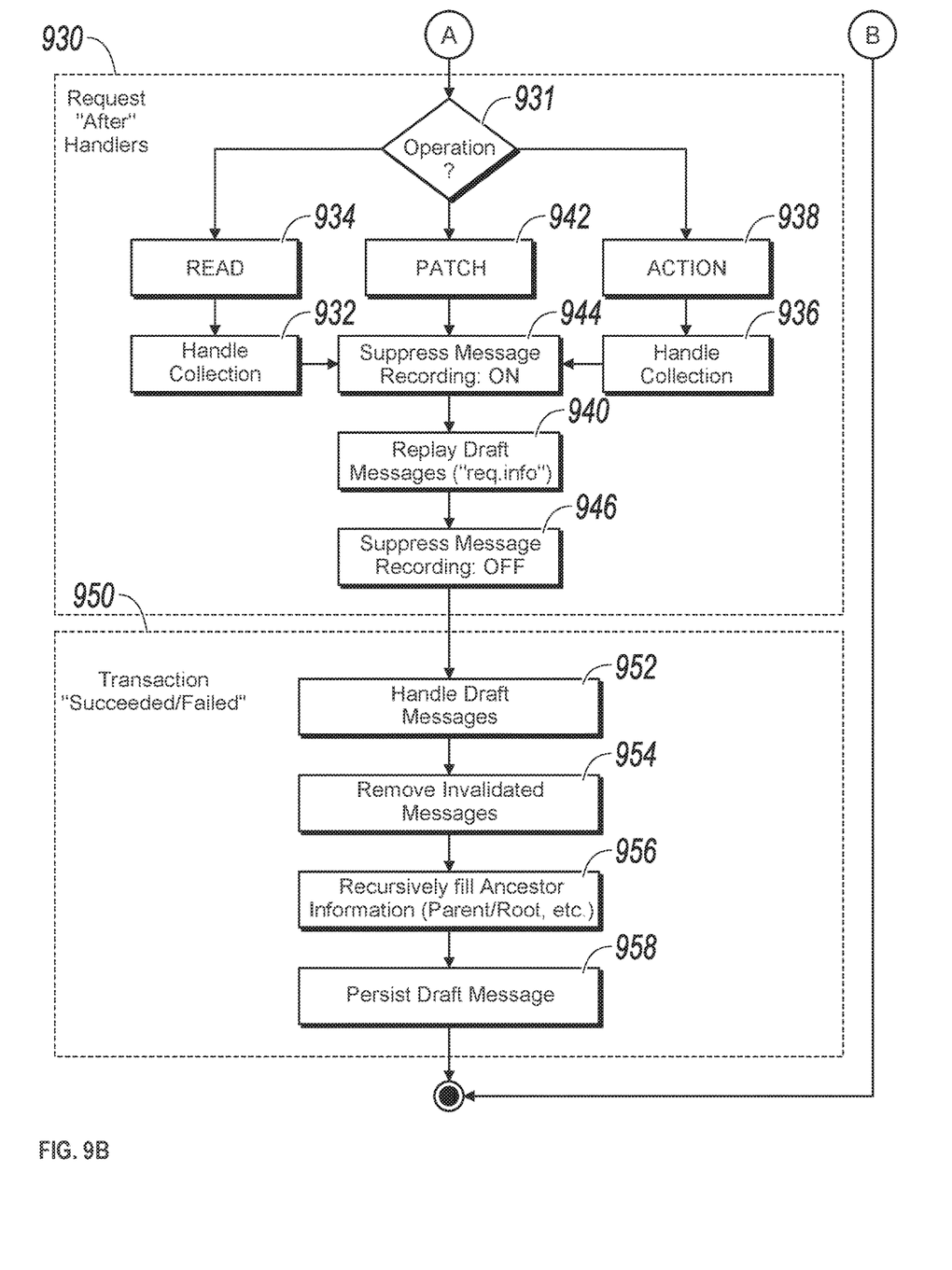

FIGS. 9A-9B depict a flowchart 900 that illustrates various types of handlers for persistent draft message processing. Implementation of persistent draft messages can include configuring various types of event handlers. At 902, before any persistent draft message handlers are invoked, a determination is made as to whether an entity is draft-enabled. If the entity is not draft-enabled, persistent draft message processing can be avoided, which can save resources. If an entity is not draft-enabled, for example, a user may be editing an active instance of an entity and persistent draft messages need not be saved for the active entity since validation processing for the entity can prevent saving the active instance with any inconsistencies or errors. If the entity is draft-enabled, persistent draft message processing can be performed. An entity may be draft-enabled if the entity itself is draft-enabled or the entity is part of another entity that is draft-enabled (e.g., a sub-entity of a parent entity that is draft-enabled).

If the entity is draft-enabled, different types of before handlers 904 can be invoked to handle, for example, invalidation of previously-existing persistent draft messages. Persistent draft messages can be invalidated to distinguish previous messages from new messages, and to help clear old messages from memory (as described below). For instance, before patch processing 906 can be executed in response to a patch operation 907, before regular patch processing is performed. The patch operation 907 can correspond to an update of a particular field, for example. When executing the before-patch processing 906, previously-stored persistent draft message(s) for the field can be automatically invalidated, at a field-level. Validation of new field content can be performed as part of regular field validation, for example. If the field content is invalid, the regular field validation can generate any new appropriate error or warning messages.

Before-cancel processing 908 can be executed in response to a cancel operation 910, before regular cancel processing is performed. The cancel operation 910 can correspond to deletion of a draft, for example. When executing the before-cancel processing 908, previously-persisted draft messages can be marked as invalidated, based on all hierarchy levels for the entity (e.g. root, parent, entity, and sub-entity levels).

Before-save processing 912 can be executed in response to a save operation 914, before regular save processing is performed. The save operation 914 can correspond to a request to save a draft, for instance. When executing the before-save processing 912, previously-persisted messages for the entity and sub-entities can be invalidated. Previously-persisted draft messages can be invalidated so that they are distinguished from any new draft messages that may be saved when the draft is saved. The before-save processing 912 can include invalidating a root entity and a whole hierarchy below the root entity. Each of the before-patch processing 906, the before-cancel processing 908, and the before-save processing 914 can include common logic of storing invalidation in context 916 and marking the entity as invalidated 918. The marking of the entity as invalidated can enable a later commit or rollback of the invalidation. If a transaction involving the draft needs to be rolled back, invalidations can also be rolled back, as appropriate.

For some entities, custom code-based invalidation can occur, for example, as part of an implementation of an action or to handle complex cases such as interdependent fields. An action can represent a semantic action on the entity that is more involved than field-level creation, updating, or deletion. Code for an action can involve generation of error or warning messages, for example. The action code can also include custom message invalidation, to invalidate, in a current invocation of the action, any error messages that were generated in previous invocations of the action.

As another example, two fields may be interdependent. For instance, valid values for a first field may depend on a value of a second field. An error situation that may exist for the first field may be able to be corrected by changing either the value of the first field or the value of the second field. Automatic field-level invalidation (e.g., as performed in the before-patch processing 906) only invalidates prior messages for the field that was just changed. Custom code-based invalidation, in contrast, can include, for example, invalidating messages for the first field in response to a change in either the first field or the second field.

On-handler processing 920 can be invoked, for example, when validation logic results in creation of new error or warning messages for an entity. For example, validation logic can associate errors or warnings with a current user request using a "req.error" function 922 or a "req.info" function 924 of an application environment. The on-handler processing 920 can include intercepting calls to the "req.error" function 922 and the "req.info" function 924.

At 926, after a call to the "req.error" function 922 or the "req.info" function 924 is intercepted, a message target can be processed. For example, each message can include a target reference of an entity field to which the error message relates. The entity field can be correlated to a corresponding user interface element. Processing the message target can include normalizing the target by converting the target to a relative target, parsing target path parts, parsing entity keys, and determining a target entity instance (e.g., based on navigation of associations/compositions). For instance, a target may need to be normalized because a target in the context of a particular message, such as a message occurring in response to a particular patch of a given field of a given entity, may be relative to that entity (e.g., the target may just refer to a field, with the entity implied, in the context of that particular patch). Normalizing the target can include modifying the target to also include the entity (e.g., as a prefix) as well as field, for example. At 928, after the message target is processed, the message is recorded. The message can be replayed, as described below.

Different types of after handlers 930 can be executed after different types of operations 931. The after handlers 930 can involve replaying persistent draft messages that have not been invalidated, for example. For instance, after-read processing 932 can be executed in response to a read operation 934, after regular read processing is performed. Similarly, after-action processing 936 can be executed in response to an action operation 938, after regular action processing is performed.

Executing the after-read processing 932 and/or the after-action processing 936 can include, in some cases, handling a collection of entities, as appropriate. The read operation 934 or the action operation 938 may correspond to the opening of a single entity, opening an entity that includes sub-entities, or opening a list of entities, for example. Persistent draft message handling for read and action operations can handle identifying persistent draft messages for each entity instance in a collection of instances.

Persistent draft messages that are currently stored for the draft can be replayed (at 940) after the read operation 934, the action operation 936, or a patch operation 942. Messages can be replayed after the read operation 934 so that the user can be informed, after a user interface is displayed, regarding any issues with the data in the draft. For persistent draft messages that were retrieved based on instances in a collection, respective persistent draft messages can each be replayed in context of a corresponding instance. Messages can be replayed after the patch operation 942 or the action operation 938 so that the user can be informed of any issues that may be remaining with the draft data after a field update or action, respectively. As mentioned above with respect to before-patch processing, previous draft messages can be invalidated before a patch operation for a given field is performed, and new messages are only generated if the current edit of the field results in a new message. By invalidating current draft messages for a field before a patch, and replaying current draft messages for all fields after a patch, a user can be always informed of current issues (and whether a last edit of a field resolved any previous issues with that particular field).

Message replaying at step 940 can include using existing error and information callback functions of an application environment, such as a "req.info" feature of a cloud programming platform. Using the existing error and information callback functions can include retriggering the same error and callback functions that were used to originally generate the stored draft messages. In some cases, message replaying using the existing callback structure can include modifying, temporarily and for sake of message playback, a severity level of a stored error message to be a warning level instead of an error level (e.g., by using a "req.info" feature rather a "req.error" feature). In some cases and as an example, retriggering an error message could cause a read operation to fail. Converting error level messages to warning level messages can result in the user viewing the warning messages after message playback without causing the read operation to fail.

At 944, message recording can be suppressed before messages are replayed so that the duplicate messages are not recorded. At 946, message recording suppression can be turned off after the messages have been replayed.

Transaction processing 950 can be performed in response to a transaction on the draft. For example, the transaction processing 950 can be performed if a transaction to activate or save the draft is committed and the state of the draft is persisted or if the transaction to activate or save the draft fails. At 952, stored draft messages are handled (e.g., processed). For example, at 954, invalidated draft messages are removed (e.g., from a draft messages table). Invalidated draft messages can be removed to reduce size of the draft message table, for example. Invalidated draft messages can be removed at a draft transaction boundary (and not before) in case an invalid state of a draft message needs to be changed, for instance.

At 956, ancestor information for remaining draft messages is recursively filled. For instance, hierarchical information can be determined for an entity, including determining a path of the entity starting from a root node. At 958, draft messages are persisted using the hierarchical information. The draft messages can be persisted to a database in a transaction that is separate from the transaction for the draft itself.

Figure 10:
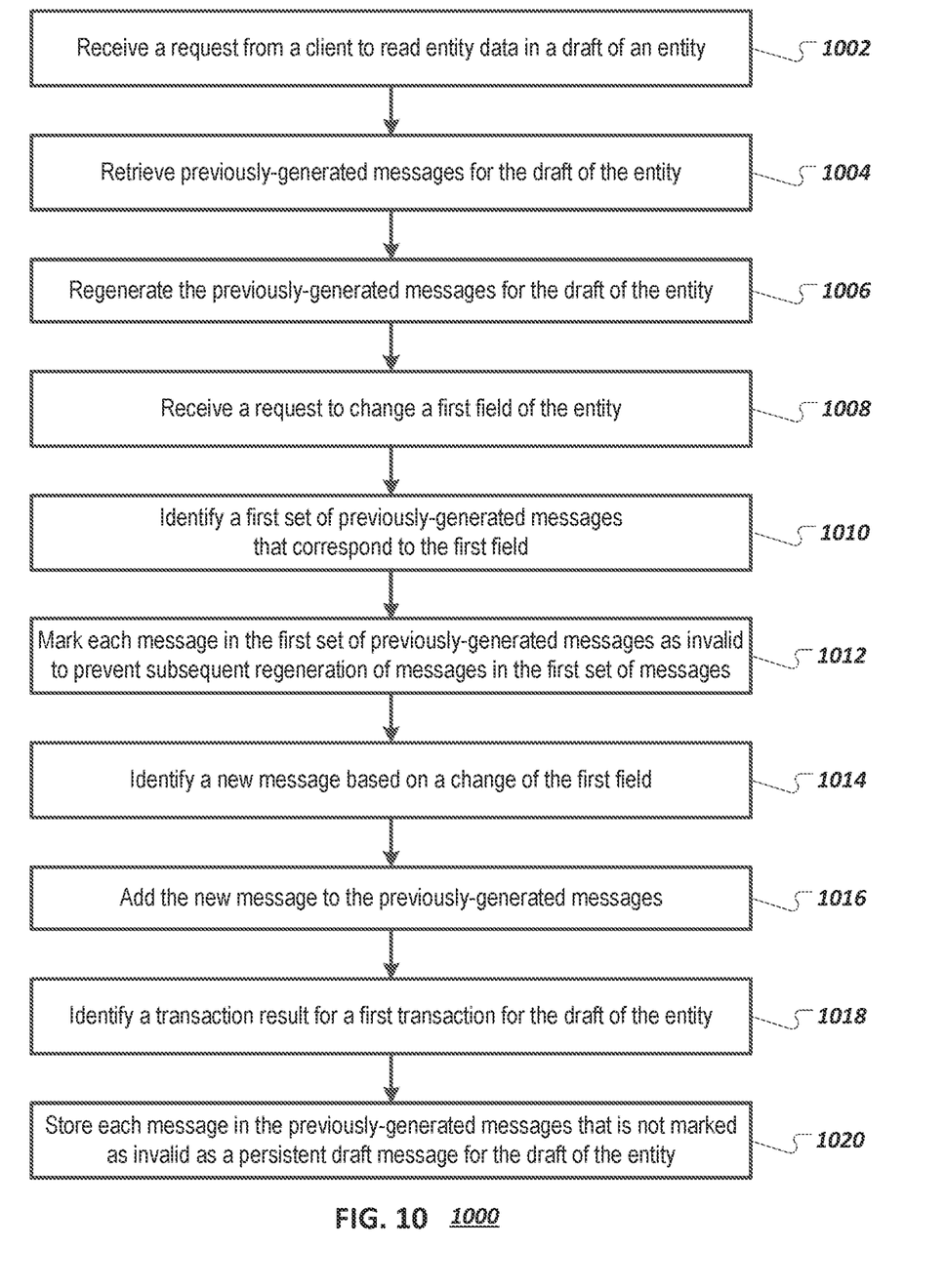
FIG. 10 is a flowchart of an example method for managing and replaying persistent draft messages for entity data.

FIG. 10 is a flowchart of an example method 1000 for managing and replaying persistent draft messages for entity data. It will be understood that method 1000 and related methods may be performed, for example, by any suitable system, environment, software, and hardware, or a combination of systems, environments, software, and hardware, as appropriate. For example, one or more of a client, a server, or other computing device can be used to execute method 1000 and related methods and obtain any data from the memory of a client, the server, or the other computing device. In some implementations, the method 1000 and related methods are executed by one or more components of the system 100 described above with respect to FIG. 1. For example, the method 1000 and related methods can be executed by the persistent draft message engine 124 of FIG. 1.

At 1002, a request is received from a client to read entity data in a draft of an entity. For example, the request can correspond to a user opening a user interface that is configured to display one or more entity instances.

At 1004, previously-generated messages for the draft of the entity are retrieved. The previously-generated messages can include error messages and/or warning messages. A check to determine whether the entity is draft-enabled can be performed before persistent draft message handling for the entity.

At 1006, the previously-generated messages for the draft of the entity are regenerated. Regenerating the previously-generated messages can include providing the previously-generated messages to the client. The client can display the previously-generated messages in a user interface. In some cases, regenerating a previously-generated message includes displaying the message in a same or similar manner as if the user had just made a change to trigger the message.

At 1008, a request to change a first field of the entity is received. The request to change the first field can correspond to an edit to a first user interface element that corresponds to the first field, or to a change to the first field performed by an action of the entity.

At 1010, a first set of previously-generated messages that correspond to the first field is identified.

At 1012, each message in the first set of previously-generated messages is marked as invalid to prevent subsequent regeneration of messages in the first set of messages.

At 1014, a new message is identified based on a change of the first field.

At 1016, the new message is added to the previously-generated messages. A target of the new message can be normalized (e.g., to a non-relative path) before the new message is added to the previously-generated messages.

At 1018, a transaction result for a first transaction for the draft of the entity is identified. The first transaction result for the draft of the entity can be a successful save of the draft.

At 1020, each message in the previously-generated messages that is not marked as invalid is stored as a persistent draft message for the draft of the entity.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
receiving a request from a client to read entity data in a draft of an entity;
retrieving previously-generated messages for the draft of the entity;
regenerating the previously-generated messages for the draft of the entity;
receiving a request to change a first field of the entity;
identifying a first set of previously-generated messages that correspond to the first field;
marking each message in the first set of previously-generated messages as invalid to prevent subsequent regeneration of messages in the first set of messages;
identifying a new message based on a change of the first field;
adding the new message to the previously-generated messages;
identifying a transaction result for a first transaction for the draft of the entity; and
storing each message in the previously-generated messages that is not marked as invalid as a persistent draft message for the draft of the entity.

2. The method of claim 1, further comprising, after receiving the request to read entity data, determining that the entity supports draft processing.

3. The method of claim 1, wherein the previously-generated messages comprise at least one error message that indicates an error condition for the entity data.

4. The method of claim 1, wherein the previously-generated messages comprise at least one warning message that indicates a non-error condition for the entity data.

5. The method of claim 1, further comprising:
identifying a message target of the new message; and
normalizing the message target of the new message.

6. The method of claim 1, further comprising:
receiving a request to delete the draft of the entity; and
marking each of the previously-generated messages as invalid in response to the request to delete the draft of the entity.

7. The method of claim 1 wherein, regenerating the previously-generated messages comprises providing the previously-generated messages to the client.

8. The method of claim 7, wherein the client displays the previously-generated messages in a user interface.

9. The method of claim 1, wherein the request to change the first field corresponds to an edit to a first user interface element that corresponds to the first field.

10. The method of claim 1, wherein the request to change the first field corresponds to a change to the first field performed by an action of the entity.

11. The method of claim 1, wherein the first transaction result for the draft of the entity comprises a successful save of the draft.

12. A system comprising:
one or more computers; and
a computer-readable medium coupled to the one or more computers having instructions stored thereon which, when executed by the one or more computers, cause the one or more computers to perform operations comprising:
receiving a request from a client to read entity data in a draft of an entity;
retrieving previously-generated messages for the draft of the entity;
regenerating the previously-generated messages for the draft of the entity;
receiving a request to change a first field of the entity;
identifying a first set of previously-generated messages that correspond to the first field;
marking each message in the first set of previously-generated messages as invalid to prevent subsequent regeneration of messages in the first set of messages;
identifying a new message based on a change of the first field;
adding the new message to the previously-generated messages;
identifying a transaction result for a first transaction for the draft of the entity; and
storing each message in the previously-generated messages that is not marked as invalid as a persistent draft message for the draft of the entity.

13. The system of claim 12, wherein the operations further comprise, after receiving the request to read entity data, determining that the entity supports draft processing.

14. The system of claim 12, wherein the previously-generated messages comprise at least one error message that indicates an error condition for the entity data.

15. The system of claim 12, wherein the previously-generated messages comprise at least one warning message that indicates a non-error condition for the entity data.

16. The system of claim 12, wherein the operations further comprise:
identifying a message target of the new message; and
normalizing the message target of the new message.

17. A computer program product encoded on a non-transitory storage medium, the product comprising non-transitory, computer readable instructions for causing one or more processors to perform operations comprising:
receiving a request from a client to read entity data in a draft of an entity;
retrieving previously-generated messages for the draft of the entity;
regenerating the previously-generated messages for the draft of the entity;
receiving a request to change a first field of the entity;
identifying a first set of previously-generated messages that correspond to the first field;
marking each message in the first set of previously-generated messages as invalid to prevent subsequent regeneration of messages in the first set of messages;
identifying a new message based on a change of the first field;
adding the new message to the previously-generated messages;
identifying a transaction result for a first transaction for the draft of the entity; and
storing each message in the previously-generated messages that is not marked as invalid as a persistent draft message for the draft of the entity.

18. The computer program product of claim 17, wherein the operations further comprise, after receiving the request to read entity data, determining that the entity supports draft processing.

19. The computer program product of claim 17, wherein the previously-generated messages comprise at least one error message that indicates an error condition for the entity data.

20. The computer program product of claim 17, wherein the previously-generated messages comprise at least one warning message that indicates a non-error condition for the entity data.

* * * * *